(12) United States Patent
Gundlach et al.

(10) Patent No.: US 6,274,645 B1
(45) Date of Patent: Aug. 14, 2001

(54) WASHING COMPOSITION FOR INDELIBLE MARKS

(75) Inventors: Kurt B. Gundlach, Fairport; Richard L. Colt, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/405,680

(22) Filed: Sep. 24, 1999

Related U.S. Application Data

(63) Continuation-in-part of application No. 09/106,621, filed on Jun. 29, 1998.

(51) Int. Cl.$^7$ .............................. C09D 11/10; C11D 1/26; C11D 3/065; C11D 3/43; C11D 7/10
(52) U.S. Cl. ..................... 523/160; 510/174; 106/31.43
(58) Field of Search .................... 523/160, 161; 106/31.27, 31.32, 31.4, 31.43, 31.47, 31.49, 31.59; 510/174

(56) References Cited

U.S. PATENT DOCUMENTS

| | | | |
|---|---|---|---|
| 4,162,983 | * 7/1979 | Johnson | 510/328 |
| 4,197,135 | 4/1980 | Bailey et al. | 106/23 |
| 4,231,841 | 11/1980 | Calmanti et al. | 162/5 |
| 4,267,088 | 5/1981 | Kempf | 260/29.2 EP |
| 4,391,639 | 7/1983 | Kobayashi | 106/22 |
| 4,396,521 | * 8/1983 | Borrello | 510/284 |
| 4,659,382 | 4/1987 | Kang | 106/22 |
| 4,797,231 | * 1/1989 | Schumann et al. | 252/247 |
| 4,961,785 | 10/1990 | Skene et al. | 106/22 |
| 5,017,224 | 5/1991 | Tomita et al. | 106/22 |
| 5,019,164 | 5/1991 | Tomita et al. | 106/22 |
| 5,019,166 | 5/1991 | Schwarz | 106/22 |
| 5,059,246 | 10/1991 | Yamamoto et al. | 106/22 |
| 5,091,005 | 2/1992 | Mueller et al. | 106/22 |
| 5,116,410 | 5/1992 | Miller | 106/22 |
| 5,156,675 | 10/1992 | Breton et al. | 106/22 |
| 5,223,338 | 6/1993 | Malhotra | 428/342 |
| 5,250,107 | 10/1993 | Bares | 106/20 R |
| 5,262,535 | 11/1993 | Kaiser | 544/402 |
| 5,415,814 | * 5/1995 | Ofosu-Asante et al. | 510/235 |
| 5,417,893 | * 5/1995 | Ofosu-Asante | 510/235 |
| 5,486,228 | * 1/1996 | Miller et al. | 106/31.32 |
| 5,509,957 | 4/1996 | Toan et al. | 106/20 R |
| 5,518,534 | 5/1996 | Pearlstine et al. | 106/20 R |
| 5,618,338 | 4/1997 | Kurabayashi et al. | 106/26 R |
| 5,667,572 | 9/1997 | Taniguchi et al. | 106/31.36 |
| 5,698,478 | 12/1997 | Yamamoto et al. | 442/153 |
| 5,709,737 | 1/1998 | Malhotra et al. | 106/31.43 |
| 5,746,818 | 5/1998 | Yatake | 106/31.86 |
| 5,773,405 | * 6/1998 | Bruhnke | 510/419 |
| 5,788,750 | 8/1998 | Gundlach et al. | 106/31.27 |
| 5,853,469 | 12/1998 | Colt et al. | 106/31.49 |
| 5,853,743 | * 12/1998 | Gambogi et al. | 424/405 |
| 6,017,872 | * 1/2000 | Pedersen et al. | 510/424 |

FOREIGN PATENT DOCUMENTS 56-83568  12/1982  (JP).

\* cited by examiner

*Primary Examiner*—Vasu Jagannathan
*Assistant Examiner*—Callie E. Shosho
(74) *Attorney, Agent, or Firm*—Judith L. Byorick

(57) ABSTRACT

Disclosed is a washing composition which comprises a linear alkyl diphenyl oxide disulfonate compound, a chloride, bromide, iodide, nitrate, acetylacetonate, polyphosphate, squarate, or sulfonate salt or mixtures thereof, and a cosolvent which is propylene glycol, dipropylene glycol, tripropylene glycol, diethylene glycol, glycerine, trimethylolethane, trimethylolpropane, or mixtures thereof.

25 Claims, No Drawings

WASHING COMPOSITION FOR INDELIBLE MARKS

This application is a continuation-in-part of copending application U.S. Ser. No. 09/106,621, filed Jun. 29, 1998, entitled "Ink Compositions Substantially Free of Organic Liquids," the disclosure of which is totally incorporated herein by reference.

BACKGROUND OF THE INVENTION

The present invention is directed to washing compositions. More specifically, the present invention is directed to washing compositions that remove marks made by indelible aqueous inks. One embodiment of the present invention is directed to a washing composition which comprises a linear alkyl diphenyl oxide disulfonate compound, a chloride, bromide, iodide, nitrate, acetylacetonate, polyphosphate, squarate, or sulfonate salt or mixtures thereof, and a cosolvent which is propylene glycol, dipropylene glycol, tripropylene glycol, diethylene glycol, glycerine, trimethylolethane, trimethylolpropane, or mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697, 195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Aqueous inks are also used in marking pens, such as felt tipped pens, roller ball pens, fountain pens, ballpoint pens, and the like for applications such as highlighters, indelible markers, writing implements, and the like. Inexpensive, ecologically friendly, and nontoxic ink compositions that dry rapidly on substrates such as paper, overhead transparencies, and certain solid surfaces are particularly desirable in these applications.

U.S. Pat. No. 5,250,107 (Bares) discloses a water-fast ink composition and method for making the same. A selected chemical dye having at least one functional group with an extractable hydrogen atom thereon (e.g. —COOH, —NH$_2$, or —OH) is combined with an ammonium zirconium polymer salt (e.g. ammonium zirconium carbonate, ammonium zirconium acetate, ammonium zirconium sulfate, ammonium zirconium phosphate, and ammonium zirconium oxalate). The resulting mixture preferably contains about 0.01–5.0% by weight ammonium zirconium polymer salt and about 0.5–5.0% by weight chemical dye. Upon dehydration of the mixture, the ammonium zirconium polymer salt and chemical dye form a cross-linked dye complex which is stable and water-fast. The mixture may be dispensed onto a variety of substrates (e.g. paper) using thermal ink jet or other printing systems.

U.S. Pat. No. 4,267,088 (Kempf) discloses coatings particularly useful as marking inks in which an epichlorohydrin-modified polyethyleneimine and an ethylene oxide-modified polyethyleneimine cooperate in aqueous solution to form a composition capable of application to form deposits adherent to most materials and resistant to most organic solvents but readily removable by water.

U.S. Pat. No. 4,197,135 (Bailey et al.) discloses an ink for use in ink jet printers containing a water soluble dye and a polyamine containing 7 or more nitrogen atoms per molecule, with the ink composition having a pH of 8 or above, the upper pH limit being dye decomposition dependent. The ink has improved waterfastness over an equivalent ink formulation without the polyamine additive.

U.S. Pat. No. 4,659,382 (Kang) discloses an ink jet ink composition comprising a major amount of water, a hydroxyethylated polyethyleneimine polymer, and a dye component, wherein the polymer has incorporated therein from about 65 to about 80 percent by weight of hydroxyethyl groups.

U.S. Pat. No. 5,091,005 (Mueller et al.) discloses inks comprising, by weight, from about 4% to about 10% formamide, from about 1% to about 10% dye, and the balance water when printed on paper from an ink-jet printer have improved resistance to bleed, especially when printed at a rate up to about 3.7 kHz.

U.S. Pat. No. 4,961,785 (Skene et al.) discloses inks for ink-jet printing have improved smear resistance when they contain from about 15 to 50%, preferably from about 20% to about 30%, formamide.

Japanese Patent publication 57–198768 discloses a type of water-base ink made of acidic dye and/or direct dye, cationic water-soluble resin, water-soluble organic solvent, and water.

U.S. Pat. No. 5,853,469 (Colt et al.), the disclosure of which is totally incorporated herein by reference, discloses an ink composition which comprises water, a colorant, and an additive selected from imidazolium formate, imidazolium phosphite, and mixtures thereof. Another embodiment of the invention includes a process which entails incorporating an ink composition of the present invention into an ink jet printing apparatus and causing droplets of the ink composition to be ejected in an imagewise pattern onto a substrate. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the ink is used in a printing process which employs microwave drying of the printed image.

U.S. Pat. No. 5,019,164 (Tomita et al.), the disclosure of which is totally incorporated herein by reference, discloses a water resistant ink composition having a greatly improved water resistance and being excellent in resistance to drying-up, age stability, and smooth ink flowability containing a mixture of polyamine compound having only primary amino groups and a molecular weight of 300 or more and a polyamine having primary amino groups removed therefrom, that is, having only secondary and/or tertiary amino groups and a molecular weight of 300 or more and combined with an anionic dye and a stabilizing agent such as urea or the like.

U.S. Pat. No. 5,262,535 (Kaiser), the disclosure of which is totally incorporated herein by reference, discloses the reaction product of: (a) a compound of the formula

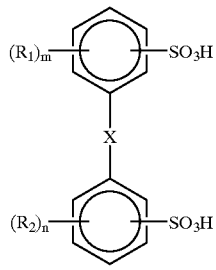

wherein X is a member selected from the group consisting of N, O, and S; $R_1$ and $R_2$ are independently a straight or branched, saturated or unsaturated non-aromatic hydrocarbon of four to eighteen carbon atoms; m is 1 or 2; and n is 0, 1 or 2; and (b) a compound selected from the group consisting of primary, secondary, tertiary and higher amines, which are liquid at room temperature. The reaction product has excellent surfactant properties, and is suitable for use in coloring compositions to improve the fugitivity from skin and clothing. The reaction product is also useful as a cleansing agent.

U.S. Pat. No. 4,391,639 (Kobayashi), the disclosure of which is totally incorporated herein by reference, discloses a recording liquid characterized by containing as a dye a compound represented by the formula

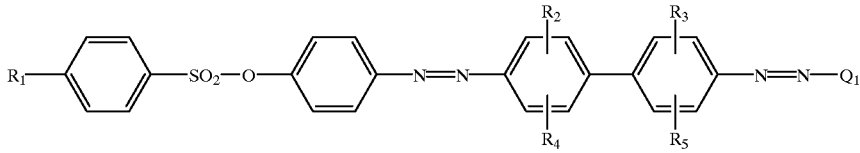

wherein $R_1$ represents hydrogen or $C_1$–$C_2$ alkyl, $R_2$ and $R_3$ each represent hydrogen, $C_1$–$C_2$ alkyl, or $C_{1-C2}$ alkoxy, $R_4$ and $R_5$ represent hydrogen or sulfo in salt form with base, and $Q_1$ represents naphthyl substituted by hydroxyl and by sulfo in salt form with base.

U.S. Pat. No. 5,059,246 (Yamamoto et al.), the disclosure of which is totally incorporated herein by reference, discloses a recording liquid comprising a coloring material and a liquid medium containing water and a water-soluble organic solvent having an ether bond, and a pH value of said recording liquid being from 3 to 9 and a peroxide concentration of the liquid medium being not more than 4 mmol/l in terms of iodine. Also disclosed is an ink jet recording process that performs recording by ejecting the recording liquid in the form of droplets from a minute ejection orifice, to a recording medium by the action of heat energy.

U.S. Pat. No. 5,788,750 (Gundlach et al.), the disclosure of which is totally incorporated herein by reference, discloses an ink composition which comprises water, a colorant, a nonionic surfactant, and a fluorinated material selected from the group consisting of (a) those of the formula $[(F_{2n+1}C_nCH_2S)_2(CH_3)C-CH_2CH_2COO^-][B^+]$, wherein n is an integer of from about 8 to about 20 and B is a cation, and (b) those of the formula $[(F_3C(F_2C)_nCH=CHCH_2OCH(OH)CH_2)_2NCH_2COO^-][X^+]$, wherein X is a cation. Also disclosed are ink jet printing processes employing the aforementioned ink.

U.S. Pat. No. 5,746,818 (Yatake), the disclosure of which is totally incorporated herein by reference, discloses an ink for ink jet recording which can form a record having a high color density, free from the occurrence of bleeding or feathering even on recycled paper, and possessing water resistance. An ink composition comprising a pigment dispersible and/or soluble in water without the aid of any dispersant and a glycol ether selected from the group consisting of diethylene glycol mono-n-butyl ether, triethylene glycol mono-n-butyl ether, propylene glycol mono-n-butyl ether, and dipropylene glycol mono-n-butyl ether can realize a print having no significant bleeding or feathering. Further, a high-quality image having much less bleeding or feathering can be realized by an ink jet recording method wherein a reaction solution, containing a reactant, capable of breaking the state of dispersion and/or dissolution of a pigment in the ink composition is brought into contact with the ink composition.

U.S. Pat. No. 5,709,737 (Malhotra et al.), the disclosure of which is totally incorporated herein by reference, discloses an ink composition which comprises an aqueous liquid vehicle, a colorant, and an additive material selected from the group consisting of (a) symmetric acetylenic bisester alcohols, (b) symmetric acetylenic bisalkyl alcohols and acetylenic bisalkoxy alcohols, (c) symmetric acetylenic bisamido alcohols, (d) symmetric bisamido alcohols, (e) mono amido alcohols, (f) trialkylhydroxy compounds, (g) derivatives of 1,2-diols and 1,3-diols, (h) thio diols, (i) aromatic diols, (j) heterocyclic diols, (k) imino alcohols, (l) salts of hydroxyl compounds, (m) saccharides and saccharide derivatives, and (n) mixtures thereof. Also disclosed is an ink jet process which comprises (1) incorporating into a thermal ink jet printing apparatus the aforementioned ink composition; and (2) causing droplets of the ink to be ejected from the printing apparatus in an imagewise pattern onto a substrate, thereby generating images on the substrate. Further disclosed is an ink jet printing process which comprises (1) incorporating into a thermal ink jet printing apparatus the aforementioned ink composition; (2) causing droplets of the ink to be ejected from the printing apparatus in an imagewise pattern onto a substrate, thereby generating images on the substrate; and (3) exposing the substrate to microwave radiation, thereby drying the images on the substrate.

U.S. Pat. No. 5,698,478 (Yamamoto et al.), the disclosure of which is totally incorporated herein by reference, discloses an ink jet printing cloth which can be dyed with inks containing a reactive dye and is composed mainly of cellulose fiber, wherein the cloth contains 0.1 to 50 percent by weight of a cationic substance, 0.01 to 5 percent by weight of an alkaline substance, and 0.01 to 20 percent by weight of the ammonium salt of a polyvalent acid, the proportions of said cationic and alkaline substances and said ammonium salt being based on the dry weight of the cloth.

U.S. Pat. No. 5,667,572 (Taniguchi et al.), the disclosure of which is totally incorporated herein by reference, discloses an ink composition which can provide a print having better waterfastness, stably contains a colorant substantially insoluble or sparingly soluble in water, is less likely to cause clogging of a recording head, and can be advantageously used for ink jet recording. The ink composition comprises a colorant which is either sparingly soluble or insoluble in water, a water-soluble organic solvent capable of dissolving the colorant, a saccharide and/or polyvinyl pyrrolidone, and water.

U.S. Pat. No. 5,223,338 (Malhotra), the disclosure of which is totally incorporated herein by reference, discloses a recording sheet comprising a substrate and a coating consisting essentially of an optional binder, an optional filler, and quaternary ammonium polymers selected from

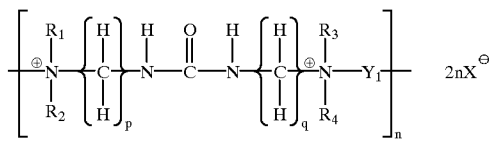

wherein n is an integer from 1 to 200, $R_1$, $R_2$, $R_3$, and $R_4$ are selected from alkyl, hydroxyalkyl, and polyoxyalkylene, p is an integer from 1 to 10, q is an integer from 1 to 10, X is an anion, and $Y_1$ is selected from $-CH_2CH_2OCH_2CH_2-$, $-CH_2CH_2OCH_2CH_2OCH_2CH_2-$, $-(CH_2)_k-$, wherein k is an integer from 2 to 10, and $-CH_2CH(OH)CH_2-$;

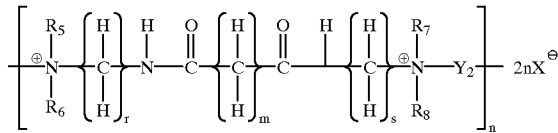

wherein n is an integer from 1 to 200, $R_5$, $R_6$, $R_7$, and $R_8$ are selected from alkyl, hydroxyalkyl, and polyoxyalkylene, m is an integer from 0 to 40, r is an integer from 1 to 10, s is an integer from 1 to 10, X is an anion, and $Y_2$ is selected from $-CH_2CH_2OCH_2CH_2-$, $-CH_2CH_2OCH_2CH_2OCH_2CH_2-$, $-(CH_2)_k-$, wherein k is an integer from 2 to 10, and $-CH_2CH(OH)CH_2-$;

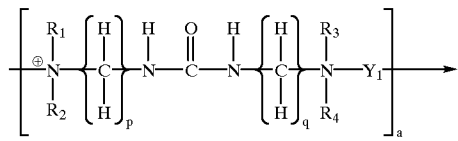

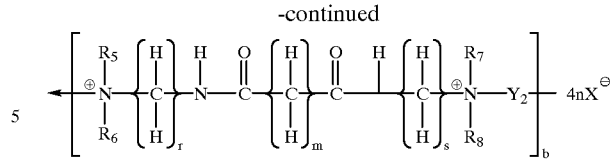

wherein a and b are integers wherein the sum of a+b is from 2 to 200, $R_1$, $R_2$, $R_3$, $R_4$, $R_5$, $R_6$, $R_7$, and $R_8$ are selected from alkyl, hydroxyalkyl, and polyoxyalkylene, p is an integer from 1 to 10, q is an integer from 1 to 10, X is an anion, and $Y_1$ and $Y_2$ are selected from $-CH_2CH_2OCH_2CH_2-$, $-CH_2CH_2OCH_2CH_2OCH_2CH_2-$, $-(CH_2)_k-$, wherein k is an integer from 2 to 10, and $-CH_2CH(OH)CH_2-$. Mixtures of these polymers are also suitable.

U.S. Pat. No. 5,618,338 (Kurabayashi et al.), the disclosure of which is totally incorporated herein by reference, discloses a liquid composition containing at least a cationic substance and finely ground cellulose. The invention further provides a liquid composition which contains a cationic substance having a molecular weight of 1000 or less and finely ground cellulose. The invention further provides an ink set which is obtained by combining the liquid composition with an ink, and an image-forming method and apparatus which employ the liquid composition and the ink.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions disclosed herein to be ejected from a thermal ink jet printer in imagewise fashion onto a substrate.

U.S. Pat. No. 5,156,675 (Breton et al.), the disclosure of which is totally incorporated herein by reference, discloses fast drying ink compositions containing a colorant, a dye, water and a cosolvent. Some of the ink compositions dry in less than about 1 second and have a viscosity of between about 1.6 and about 2.5 centipoise and a specified surface tension. Some of the ink compositions contain specified cosolvents, preferably a mixture of diethylene glycol monobutyl ether and glycerol.

U.S. Pat. No. 5,518,534 (Pearlstine et al.), the disclosure of which is totally incorporated herein by reference, discloses an ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C.

U.S. Pat. No. 5,509,957 (Toan et al.), the disclosure of which is totally incorporated herein by reference, discloses ink compositions, in particular for ink jet printing, containing as stabilizer a water soluble compound of formula

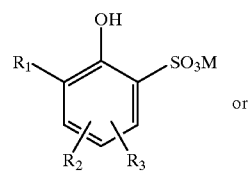

or

-continued

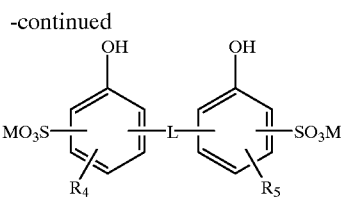

wherein $R_1$ is H, $C_1$–$C_{18}$ alkyl, $C_7$–$C_9$ phenylalkyl, phenyl, or a group of formula III

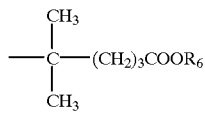

$R_2$ is H, $C_1$–$C_{18}$ alkyl, $C_7$–$C_9$ phenylalkyl, phenyl, a group of formula III, or group of formula —$CH_2CH_2COOR_6$, $R_3$ is H or $C_1$–$C_4$ alkyl, M is H, an alkali metal ion or a group $(R_7)(R_8)(R_9)(R_{10})N$ wherein $R_7$, $R_8$, $R_9$, and $R_{10}$ are each independently of one another H, unsubstituted $C_1$–$C_4$ alkyl, $C_1$–$C_4$ alkyl which is substituted by 1 to 3 —OH groups, $C_3$–$C_{20}$ alkyl which is interrupted by one or more than one oxygen atom, or are allyl, cyclopentyl, cyclohexyl, phenyl, benzyl or tolyl, L is a direct bond, —$C(R_{11})(R_{12})$—, or —S—, wherein $R_{11}$ and $R_{12}$ are each independently of the other H or $C_1$–$C_8$ alkyl, or $R_{11}$ and $R_{12}$, together with the linking carbon atom, form a cyclopentylene, cyclohexylene, or cycloheptylene ring, each unsubstituted or substituted by 1 to 3 $C_1$–$C_4$ alkyl groups, $R_4$ and $R_5$ are each independently of the other H or $C_1$–$C_8$ alkyl, $R_6$ is M, unsubstituted $C_1$–$C_4$ alkyl, or $C_1$–$C_4$ alkyl which is substituted by one —OH group, or is $C_3$–$C_{20}$ alkyl which is interrupted by one or more than one oxygen atom, and n is 0 or 1, said compounds, and recording materials containing them, and also discloses a process for stabilizing ink jet prints, the stabilizer being a compound of formula (I) or (II).

U.S. Pat. No. 5,116,410 (Miller), the disclosure of which is totally incorporated herein by reference, discloses a washable dye-containing composition comprising an acid dye, a dye vehicle, and an organic sulfonate in an amount of at least about 10 percent by weight of the composition. In one preferred embodiment, the composition is a washable marker ink, comprising an acid dye, water, and an aromatic sulfonate in an amount of at least about 10 percent by weight of the composition. In another embodiment, the composition is in the form of a water-soluble tempera paint comprising an acid dye, water, fillers, thickeners, opacifiers, and an organic sulfonate in an amount of at least about 10 percent by weight of the composition.

U.S. Pat. No. 4,231,841 (Calmanti et al.), the disclosure of which is totally incorporated herein by reference, discloses a de-inking composition consisting substantially of: (A) a salt of a fatty acid of the formula R—COO—M wherein R represents one or more hydrocarbon chains selected from the class consisting of saturated and/or unsaturated hydrocarbons and M represents a metal selected from the class consisting of Na and K, said fatty acid salt being present in an amount between 5 and 32 percent with respect to the weight of the entire composition; (B) a nonionic ethoxylated and/or propoxylated surfactant of the formula

wherein Y is either H or $CH_3$; $R^1O$ represents the hydrophobic moiety of the molecule and is derived from a compound selected from the class consisting of alkylphenols of formula

saturated primary fatty alcohols of formula $R''$—$CH_2OH$; saturated secondary fatty alcohols of formula $R'''$

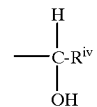

fatty acids of the formula $R^v$—COOH; and mixtures thereof, wherein R', R", R''', $R^{iv}$ and $R^v$ are alkyl chains; and n is a number between 2 and 40; said nonionic surfactant being present in an amount between 5 and 25 percent by weight of the entire composition; (C) an anionic surfactant selected from the class consisting of sulphonates of the formula $R^2$—$SO_3$—M'; sulphates of formula $R^3$—O—$SO_3$—M', and mixtures thereof, wherein $R^2$ is selected from the class consisting of linear paraffin chains, olefine chains, and alkylaryl chains, $R^3$ is a paraffin chain, and M' is selected from the class consisting of Na, K, $NH_4$, and mono-, di- and tri-substituted alkylamines; said anionic surfactant being present in an amount between 2 and 8 percent with respect to the weight of the entire composition; (D) a sodium-carboxylmethyl-cellulose in an amount between 1 and 5 percent with respect to the weight of the entire composition; and (E) an alkaline inorganic salt selected from the class consisting of metasilicate, disilicate, carbonate, borate and polyphosphates, said alkaline inorganic salt being present in an amount between 30 and 80 percent of the entire composition; the percentages of the components (A), (B), (C), (D) and (E) totaling essentially 100 percent. A process of de-inking is also disclosed.

U.S. Pat. No. 5,017,224 (Tomita et al.), the disclosure of which is totally incorporated herein by reference, discloses an aqueous ink composition having high water resistance and excellent age stability and resistance to drying-up. A feature resides in a water resistant ink composition comprising an aqueous vehicle which contains a polyamine containing primary amino groups in the proportion of 3–20 percent of amino groups contained in a molecule, one, two, or more stabilizing agent selected from urea, thiourea, ethylene urea, hydroxyethyl urea, hydroxypropyl urea, ethylene, thiourea, diethyl thiourea, 2-pyrrolidone, polyvinyl pyrrolidone, sorbitol, dimethylsulfone, and mixtures thereof, and water and an anionic dye having a solubility of 10 percent by weight or more in said aqueous vehicle.

Copending application U.S. Ser. No. 09/046,895, filed Mar. 24, 1998, entitled "Ink Compositions and Multicolor Thermal Ink Jet Printing Process for the Production of High Quality Images," with the named inventor John Wei-Ping Lin, the disclosure of which is totally incorporated herein by reference, discloses a set of inks for printing multicolor images in an ink jet printer, said ink set comprising (A) a first ink having a first color and comprising water and a colorant selected from the group consisting of (1) anionic dyes, (2) dyes having physically or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink.

Copending application U.S. Ser. No. 09/047,097, filed Mar. 24, 1998, entitled "Ink Compositions With Improved Waterfastness and Smear Resistance," with the named inventors Kurt B. Gundlach, Richard L. Colt, Luis A. Sanchez, Maura A. Sweeney, and Edward J. Radigan, Jr., the disclosure of which is totally incorporated herein by reference, discloses an ink composition which comprises water, an anionic dye, and a polyquaternary amine compound selected from the group consisting of polydiallyl dimethyl ammonium compounds, polyquaternized polyvinylamines, polyquaternized polyallylamines, and mixtures thereof. Also disclosed are methods for using the aforementioned ink composition in ink jet printing processes.

Copending application U.S. Ser. No. 09/046,852, filed Mar. 24, 1998, entitled "Ink Compositions With Improved Shelf Stability", with the named inventors Kurt B. Gundlach, Luis A. Sanchez, Richard L. Colt, Maura A. Sweeney, and William M. Schwarz, the disclosure of which is totally incorporated herein by reference, discloses an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water; (2) a nonpolymeric salt comprising at least one cation and at least one anion; (3) an anionic dye; and (4) a polyquaternary amine compound. In one embodiment, the polyquaternary amine compound is selected from the group consisting of polydiallyl dimethyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

Copending application U.S. Ser. No. 09/046,849, filed Mar. 24, 1998, entitled "Ink Compositions Containing Cationic Amido Amine Polymers", with the named inventor William M. Schwarz, the disclosure of which is totally incorporated herein by reference, discloses an ink composition which comprises (1) water; (2) a dye; and (3) a cationic amido amine copolymer. Also disclosed are methods for using the aforementioned ink composition in ink jet printing processes.

Copending application U.S. Ser. No. 09/047,278, filed Mar. 24, 1998, entitled "Ink Compositions Containing Vinyl Pyrrolidinone/Vinyl Imidazolium Copolymers", with the named inventor William M. Schwarz, the disclosure of which is totally incorporated herein by reference, discloses an ink composition which comprises (1) water; (2) an anionic dye; and (3) a copolymer of vinyl pyrrolidinone and a vinyl imidazolium salt. Also disclosed are methods for using the aforementioned ink compositions in ink jet printing processes.

Copending application U.S. Ser. No. 09/106,391, entitled "Ink Compositions Containing Oxy Acids or Oxy Acid Salts," with the named inventor William M. Schwarz, filed Jun. 29, 1998, the disclosure of which is totally incorporated herein by reference, discloses an ink composition which comprises (1) water; (2) a colorant; and (3) an additive selected from the group consisting of oxy acids, oxy acid salts, and mixtures thereof. Also disclosed is a thermal ink jet printing process employing the ink.

Copending application U.S. Ser. No. 09/106,396, entitled "Ink Compositions Containing Ionic Liquid Solvents," with the named inventor William M. Schwarz, filed Jun. 29, 1998, the disclosure of which is totally incorporated herein by reference, discloses an ink composition which comprises water, a colorant, and an ionic liquid material. In a preferred embodiment, the ink is substantially free of organic solvents. Also disclosed is a process which comprises incorporating the ink composition into an ink jet printing apparatus and causing droplets of the ink composition to be ejected in an imagewise pattern onto a substrate.

Copending application U.S. Ser. No. 09/106,621, entitled "Ink Compositions Substantially Free of Organic Liquids," with the named inventors Kurt B. Gundlach, Maura A. Sweeney, Luis A. Sanchez, Richard L. Colt, and Melvin D. Croucher, filed Jun. 29, 1998, the disclosure of which is totally incorporated herein by reference, discloses an ink composition which comprises water, an acid dye, a monovalent salt, a polyquaternary amine compound, and an optional nonionic or cationic surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

Copending application U.S. Ser. No. 09/106,527, entitled "Inks for Ink Jet Printing With Reduced Intercolor Bleed," with the named inventor William M. Schwarz, filed Jun. 29, 1998, the disclosure of which is totally incorporated herein by reference, discloses an ink composition which comprises water, an anionic dye, and a monoquaternary cationic penetrant of the formula

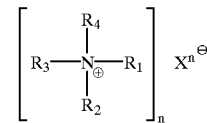

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper. Also disclosed is a set of inks for generating multicolored images which comprises (a) a first ink as described above; and (b) a second ink comprising water and a pigment; wherein intercolor bleed between the first ink and the second ink is reduced. Further disclosed are ink jet printing processes with the ink and ink set described above.

While known compositions and processes are suitable for their intended purposes, a need remains for improved ink compositions, particularly those suitable for use in ink jet printing and marking pens. In addition, a need remains for ink compositions which are substantially free of organic liquids. Further, a need remains for ink compositions which are substantially free of volatile compounds. Additionally, a need remains for ink compositions which are ecologically friendly. There is also a need for ink compositions which are nontoxic. In addition, there is a need for ink compositions which exhibit smooth jettability in ink jet printers. Further, there is a need for ink compositions which have desirable penetrating characteristics with respect to printing substrates such as paper. Additionally, there is a need for ink compositions which exhibit reduced intercolor bleed when different colored inks are printed adjacent to each other or on top of each other. A need also remains for indelible ink compositions with the above advantages. In addition, a need remains for ink compositions which generate waterfast images. Further, a need remains for ink compositions which generate smear resistant images. Additionally, a need remains for washing compositions to remove otherwise indelible images made by the inks.

SUMMARY OF THE INVENTION

The present invention is directed to a washing composition which comprises a linear alkyl diphenyl oxide disulfonate compound, a chloride, bromide, iodide, nitrate, acetylacetonate, polyphosphate, squarate, or sulfonate salt or mixtures thereof, and a cosolvent which is propylene glycol, dipropylene glycol, tripropylene glycol, diethylene glycol, glycerine, trimethylolethane, trimethylolpropane, or mixtures thereof.

DETAILED DESCRIPTION OF THE INVENTION

Indelible ink compositions the marks of which can be removed by the washing compositions of the present invention comprise an aqueous liquid vehicle, an acid dye, a monovalent salt, a polyquaternary amine compound, and an optional nonionic or cationic surfactant. In conventional aqueous inks commonly used for ink jet inks, the liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In these ink compositions, the liquid vehicle is present typically in an amount of at least about 80 percent by weight of the ink, and preferably at least about 90 percent by weight of the ink, and is present typically in an amount of up to about 99.9 percent by weight of the ink, and preferably up to about 99 percent by weight of the ink, although the amount can be outside these ranges.

In one embodiment, the indelible ink compositions of which the marks thereof can be removed by the washing compositions of the present invention are substantially free of organic solvents, by which is meant that the ink is substantially free of all organic cosolvents, humectants, penetrants, or other materials (other than the optional surfactant) which in their pure form are liquid at about 30° C. and about 1 atmosphere of pressure. The presence of the monovalent salt in the ink eliminates the need for these materials. In the absence of organic solvents, the inks are ecologically friendly, nontoxic, and still exhibit excellent jetting characteristics. In addition, it is believed that better edge sharpness (MFLEN) can be obtained if nonpolar solvents are avoided.

Ink compositions the marks of which can be removed by the washing compositions of the present invention also include an acid dye or a direct dye. Any suitable acid dye or mixture of acid dyes compatible with the ink liquid vehicle can be used. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1,8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Pylam Certified D&C Red #28 (Acid Red 92), available from Pylam; Tartrazine Extra Conc. (FD&C Yellow #5, Acid Yellow 23), available from Sandoz; D&C Yellow #10 (Acid Yellow 3), available from Tricon; Pro-Jet® Magenta I (Acid Red 249); Duasyn® Acid Yellow XX-SF LP413 (Acid Yellow 23); Duasyn® Rhodamine B-SF VP353 (Acid Red 52); Duasyn® Acid Blue AE-SF VP344 (Acid Blue 9); Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Carodirect Yellow RL (Direct Yellow 86), available from Carolina Color and Chemical; Pro-Jets® Yellow I (Direct Yellow 86), Pro-Jet® Cyan I (Direct Blue 199), Pro-Jet® Black I (Direct Black 168), and Pro-Jet® Yellow 1-G (Direct Yellow 132), available from ICI; Duasyn® Direct Black HEF-SF (Direct Black 168), Duasyn® Direct Yellow 6G-SF VP216 (Direct Yellow 157), and Duasyn® Direct Turquoise Blue FRL-SF VP368 (Direct Blue 199), available from Hoechst; and the like, as well as mixtures thereof. The dye is present in the ink composition in any desired or effective amount, typically at least about 0.5 percent by weight of the ink, and preferably at least about 1 percent by weight of the ink, and typically up to about 15 percent by weight of the ink, and preferably up to about 10 percent by weight of the ink, although the amount can be outside of these ranges.

The ink compositions the marks of which can be removed by the washing compositions of the present invention of the present invention also contain a monovalent salt. The salt in its pure form is a solid at 25° C. and 1 atmosphere of pressure and has a molecular structure comprising a cation with a +1 charge ionically associated with an anion with a −1 charge. Examples of suitable cations include alkali metal cations, such as Li⁺, Na⁺, and K⁺, alkaline earth metal cations, such as $Mg^{2+}$ and $Ca^{2+}$, transition metal cations, such as chromium, iron, manganese, cobalt, nickel, vanadium, titanium, ruthenium, platinum, and the like, $Zn^{2+}$, nonpolymeric or monomeric ammonium and quaternary amine cations, including those of the general formula

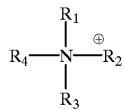

wherein each of $R_1$, $R_2$, $R_3$, and $R_4$, independently of the others, is a hydrogen atom, an alkyl group (including saturated, unsaturated, cyclic, and substituted alkyl groups, wherein substituted alkyl groups can include alkoxy or polyalkoxy groups such as ethylene oxide, polyethylene oxide, or the like), preferably with from 1 to about 10 carbon atoms and more preferably with from 1 to about 4 carbon atoms, although the number of carbon atoms can be outside of this range, aryl groups, including substituted aryl groups, preferably with from 6 to about 18 carbon atoms and more preferably with from 6 to about 12 carbon atoms, although the number of carbon atoms can be outside of this range, or arylalkyl groups, preferably with from 7 to about 20 carbon atoms and more preferably with from 7 to about 13 carbon atoms, wherein the substituents on the substituted alkyl, aryl, and arylalkyl groups can be (but are not limited to) hydroxy groups, amine groups, ammonium groups, cyano groups, pyridine groups, ether groups, aldehyde groups, ketone groups, ester groups, amide groups, carbonyl groups, sulfide groups, sulfoxide groups, phosphine groups, nitrile groups, mercapto groups, nitroso groups, halogen atoms, nitro groups, sulfone groups, acyl groups, mixtures thereof, and the like, wherein two or more substituents can be joined together to form a ring, with specific examples of ammonium and quaternary amine cations including $NH_4^+$, $N(CH_3)_4^+$, imidazolium, choline, of the formula

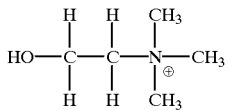

alkyl amine quaternary salts such as ETHOQUAD C/12, of the formula

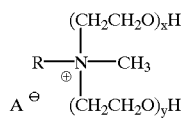

wherein R is a long chain alkyl group with 12 carbon atoms, x and y are integers of 0, 1, or 2 representing the number of ethoxy groups, wherein x+y=2, and A is an anion, such as chloride, commercially available from Akzo Chemie, Chicago, Ill., and the like, as well as mixtures thereof. Examples of suitable anions include $NO_3^-$, $ClO_4^-$, organic acid anions, such as formate, acetate, propionate, and the like, acetylacetonate, of the formula

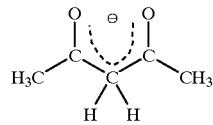

squarate, of the formula

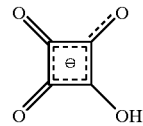

halides, including chloride, bromide, and iodide, and the like, as well as mixtures thereof. Specific examples of suitable salts include lithium chloride, lithium bromide, lithium iodide, lithium nitrate, lithium formate, lithium acetate, lithium propionate, sodium chloride, sodium bromide, sodium iodide, sodium nitrate, sodium perchlorate, sodium formate, sodium acetate, sodium propionate, potassium chloride, potassium bromide, potassium iodide, potassium formate, potassium acetate, potassium propionate, ammonium chloride, ammonium bromide, ammonium iodide, ammonium acetate, ammonium formate, ammonium nitrate, ammonium sulfate, ammonium propionate, tetramethylammonium chloride, tetramethylammonium formate, tetramethylammonium acetate, tetramethylammonium propionate, imidazole salts, such as imidazolium chloride, acetylacetonate salts, such as lithium acetylacetonate, squarate salts, such as tetramethylammonium squarate, choline salts, such as choline chloride, ETHOQUAD C/12, and the like. The salt is present in the ink in any desired or effective amount, typically at least about 1 percent by weight of the ink, and preferably at least about 5 percent by weight of the ink, and typically up to about 15 percent by weight of the ink, although the amount can be outside of these ranges.

The polyquaternary amine compound, which generally is complexed with the anionic dye in the ink, is a polymer containing quaternary groups in the repeat units thereof. The polymer typically has a weight average molecular weight of from about 1,000 to about 10,000,000, preferably from about 3,000 to about 1,000,000, and more preferably from about 5,000 to about 400,000, although the value can be outside of these ranges. The polymer typically has a number average molecular weight of from about 800 to about 11,000,000, preferably from about 3,300 to about 1,100,000, and more preferably from about 5,600 to about 450,000, although the value can be outside of these ranges. The polymer typically has from about 5 to about 70,000 repeat monomer units therein, preferably from about 21 to about 7,000 repeat monomer units, and more preferably from about 35 to about 2,800 repeat monomer units, although the number of repeat monomer units can be outside of this range. Suitable polyquaternary amine compounds typically are of the general formulae

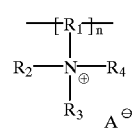 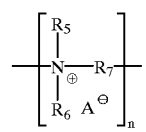

wherein n is an integer representing the number of repeat monomer units, $R_1$ is an alkylene group, including saturated, unsaturated, cyclic, and substituted alkylene groups (including polymethylene oxide groups, polyethylene oxide groups, polypropylene oxide groups, and the like), typically with from 1 to about 30 carbon atoms and preferably with from 1 to about 6 carbon atoms, an arylene group, including substituted arylene groups, typically with from 6 to about 50 carbon atoms and preferably with from 6 to about 18 carbon atoms, or an arylalkylene group, including substituted arylalkylene groups, typically with from 7 to about 60 carbon atoms and preferably with from 7 to about 20 carbon atoms, and $R_2$, $R_3$, $R_4$, $R_5$, $R_6$, and $R_7$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, alkylene, aryl, arylene, arylalkyl, and arylalkylene groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring.

Examples of suitable polyquaternary amine compounds include polydiallyl ammonium compounds, of the general formula

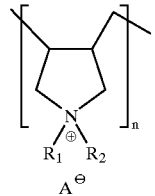

wherein n is an integer representing the number of repeat monomer units, $R_1$ and $R_2$ each, independently of the other, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, or arylalkyl groups, including substituted arylalkyl groups, typically with from about 7 to about 60 carbon atoms and preferably with from 7 to about 20 carbon atoms, wherein the substituents on the substituted alkyl aryl, and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like, such as polydiallyl dimethyl ammonium compounds, including polydiallyl dimethyl ammonium chloride, of the formula

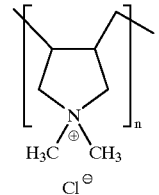

wherein n is an integer representing the number of repeat monomer units, commercially available with a molecular weight of about 400,000 (wherein n is an integer of about 2,500) from Calgon Corp. as 261-RV, and with a molecular weight of about 5,000 (wherein n is an integer of about 31) from Calgon Corp. as VARIKEM 110 or E2253.

Also suitable are polyquaternized polyvinylamines, of the general formula

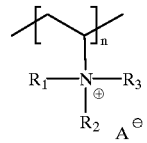

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, aryl and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like.

Also suitable are polyquaternized polyallylamines, of the general formula

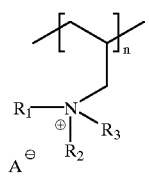

wherein n is an integer representing the number of repeat monomer units, $R_1$, $R_2$, and $R_3$ each, independently of the others, are hydrogen atoms, alkyl groups, including saturated, unsaturated, cyclic, and substituted alkyl groups (including polymethylene oxide groups, polyethylene oxide groups, polypropylene oxide groups, and the like), typically with from 1 to about 30 carbon atoms and preferably with from 1 to about 6 carbon atoms, aryl groups, including substituted aryl groups, typically with from 6 to about 50 carbon atoms and preferably with from about 6 to about 18 carbon atoms, arylalkyl groups, including substituted arylalkyl groups, typically with from 7 to about 60 carbon atoms and preferably with from 7 to about 20 carbon atoms, wherein the substituents on the substituted alkyl, aryl and arylalkyl groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring, and A is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like.

Mixtures of two or more polyquaternary amine compounds can also be present in the ink.

The polyquaternary amine compound is present in the ink in any desired or effective amount, typically at least about 0.01 percent by weight of the ink, more typically at least about 0.05 percent by weight of the ink, and preferably at least about 1 percent by weight of the ink, and typically up to about 50 percent by weight of the ink, more typically up to about 40 percent by weight of the ink, preferably up to about 10 percent by weight of the ink, more preferably up to about 9 percent by weight of the ink, and even more preferably up to about 5 percent by weight of the ink, although the amount can be outside of these ranges. The preferred relative amounts of polyquaternary amine and anionic dye in the ink can also be expressed as a stoichiometric ratio, with the molar ratio of anionic dye groups to cationic polyquaternary groups typically being at least about 1:0.33, preferably at least about 1:1, more preferably at least about 1:2, and even more preferably at least about 1:3, and typically up to about 1:300, preferably up to about 1:20, and more preferably up to about 1:6, although the relative amounts can be outside of these ranges.

In a preferred embodiment, the ink compositions the marks of which can be removed by the washing compositions of the present invention also contain a surfactant. While not being limited to any particular theory, it is believed that the presence of the surfactant enhances penetration of printing substrates such as paper and controls intercolor bleed. Nonionic surfactants, such as octylphenoxy polyethoxy ethanols, including TRITON® X-100, available from Union Carbide Co., Danbury, Conn., non-ionic esters of ethylene oxide and propylene oxide, such as MERPOL LF-H (believed to be of the formula $CH_3(CH_2)_n(OC_2H_4)_8$ $(OC_3H_6)_8OH$ where n is an integer from about 12 to about 16), available from E.I. Du Pont de Nemours & Co., Wilmington, Del., acetylenic diols such as 2,4,7,9-tetramethyl-5-decyn-4,7-diol and the like, such as SUR-FYNOL CT-136, available from Air Products & Chemicals Co., Allentown, Pa., trimethyl nonylpolyethylene-glycol ethers, such as TERGITOL TMN-10 (containing 10 oxyethylene units, believed to be of the formula $C_{12}H_{25}O(C_2H_4O)_5H$), available from Union Carbide Co., Danbury, Conn., and the like, and cationic surfactants, such as cetyl trimethyl ammonium bromide, are particularly preferred. The surfactant is present in the ink in any desired or effective amount, typically at least about 0.1 percent by weight of the ink, and typically up to about 5 percent by weight of the ink, and preferably up to about 3 percent by weight of the ink, although the amount can be outside of these ranges.

In another embodiment, the ink further optionally contains a viscosity building component. Any desired or suitable viscosity building component can be employed, such as hydrophilic polysaccharides and their modifications, including (1) starch (such as starch SLS-280, available from St. Lawrence Starch, or corn starch), (2) hydroxyalkylstarch, wherein alkyl has at least one carbon atom and wherein the number of carbon atoms is such that the material is water soluble, preferably from about 1 to about 20 carbon atoms, and more preferably from about 1 to about 10 carbon atoms, such as methyl, ethyl, propyl, butyl, or the like (such as hydroxypropyl starch (#02382, available from Poly Sciences Inc.) and hydroxyethyl starch (#06733, available from Poly Sciences Inc.)), (3) gelatin (such as Calfskin gelatin #00639, available from Poly Sciences Inc.), (4) alkyl celluloses and aryl celluloses, wherein alkyl has at least one carbon atom and wherein the number of carbon atoms is such that the material is water soluble, preferably from 1 to about 20 carbon atoms, more preferably from 1 to about 10 carbon atoms, and even more preferably from 1 to about 7 carbon atoms, such as methyl, ethyl, propyl, butyl, pentyl, hexyl, benzyl, and the like (such as methyl cellulose (Methocel AM 4, available from Dow Chemical Company)), and wherein aryl has at least 6 carbon atoms and wherein the number of carbon atoms is such that the material is water soluble, preferably from 6 to about 20 carbon atoms, more preferably from 6 to about 10 carbon atoms, and even more preferably about 6 carbon atoms, such as phenyl, (5) hydroxy alkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as hydroxyethyl cellulose (Natrosol 250 LR, available from Hercules Chemical Company), and hydroxypropyl cellulose (Klucel Type E, available from Hercules Chemical Company)), (6) alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as ethyl hydroxyethyl cellulose (Bermocoll, available from Berol Kem. A.B. Sweden)), (7) hydroxy alkyl alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxyethyl methyl cellulose (HEM, available from British Celanese Ltd., also available as Tylose MH, MHK from Kalle A.G.), hydroxypropyl methyl cellulose (Methocel K35LV, available from Dow Chemical Company), and hydroxy butylmethyl cellulose (such as HBMC, available from Dow Chemical Company)), (8) dihydroxyalkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dihydroxypropyl cellulose, which can be prepared by the reaction of 3-chloro-1,2-propane with alkali cellulose), (9) hydroxy alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxypropyl hydroxyethyl cellulose, available from Aqualon Company), (10) halodeoxycelluloses, wherein halo represents a halogen atom (such as chlorodeoxycellulose, which can be prepared by the reaction of cellulose with sulfuryl chloride in pyridine at 25° C.), (11) amino deoxycellulose (which can be prepared by the reaction of chlorodeoxy cellulose with 19 percent alcoholic solution of ammonia for 6 hours at 160° C.), (12) dialkyl amino alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, (such as diethyl amino ethyl cellulose, available from Poly Sciences Inc. as DEAE cellulose #05178), (13) carboxyalkyl celluloses, such as carboxymethyl cellulose, (14) carboxyalkyl dextrans, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, and the like, (such as carboxymethyl dextrans, available from Poly Sciences Inc. as #16058), (15) dialkyl aminoalkyl dextrans, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as diethyl aminoethyl dextran, available from Poly Sciences Inc. as #5178), (16) amino dextran (available from Molecular Probes Inc.), (17) gum arabic (such as #G9752, available from Sigma Chemical Company), (18) carrageenan (such as #C1013 available from Sigma Chemical Company), (19) Karaya gum (such as #G0503, available from Sigma Chemical Company), (20) xanthan gum (such as Keltrol-T, available from Kelco division of Merck and Company), (21) chitosan (such as #C3646, available from Sigma Chemical Company), (22) carboxyalkyl hydroxyalkyl guars, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as carboxymethyl hydroxypropyl guar, available from Aqualon Company), (23) n-carboxyalkyl chitins, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, such as n-carboxymethyl chitin, (24) agar-agar (such as that available from Pfaltz and Bauer Inc.), and the like, as well as mixtures thereof, with materials such as xanthan gum, gum arabic, alginates such as carrageenan and agar, starch, and carboxymethyl cellulose being preferred. The viscosity building component is particularly preferred in marking pen applications. Inks containing a gum viscosity building component exhibit improved edge acuity, reduced showthrough on paper, and higher optical density compared to inks not having this component. The viscosity building component is present in the ink in any desired or effective amount, typically at least about 0.1 percent by weight of the ink, and typically up to about 5 percent by weight of the ink, and preferably up to about 3 percent by weight of the ink, although the amount can be outside of these ranges.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

When used in ink jet printing applications, the ink compositions the marks of which can be removed by the washing compositions of the present invention are generally of a viscosity suitable for use in said ink jet printing processes. For example, for thermal ink jet printing applications, at room temperature (i.e., about 25° C.), typically, the ink viscosity is typically at least about 1 centipoise and typically is up to about 10 centipoise, preferably up to about 5 centipoise, and more preferably up to about 4 centipoise, although the viscosity can be outside these ranges, particularly when the ink is used for applications such as acoustic ink jet printing. When used in marking pen applications, the ink compositions are generally of a viscosity suitable for use in said applications.

The ink compositions can be of any suitable or desired pH. For some embodiments, such as thermal ink jet printing processes, typical pH values are at least about 3, preferably at least about 5, and more preferably at least about 6, and typically up to about 11, preferably up to about 10, and more preferably up to about 9, although the pH can be outside of these ranges.

The ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The ink compositions the marks of which can be removed by the washing compositions of the present invention can be used in a process which entails incorporating the ink composition into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

The ink compositions the marks of which can be removed by the washing compositions of the present invention are suitable for applications wherein indelible marks are desired. The indelible marks made by the inks can be removed with a composition which comprises a dianionic surfactant. While not being limited to any particular theory, it is believed that the indelible quality of the inks results when the anionic dye, which is ionically bonded to the polyquaternary cationic conductive polymer, bonds tightly to anionic groups such as carboxylates on substrates such as paper or cloth. Anionic dyes alone are water washable. By applying to the image a solution containing water and a dianionic surfactant, particularly wherein the anionic substituents are geometrically positioned so that they can bond tonically in a bidentate fashion more tightly than the anionic dyes to the polyquaternary polymers, the anionic dyes are again rendered washable. The dianionic surfactants are safe, and can be used on skin or in washing machines to remove the images from skin or cloth. Examples of suitable dianionic surfactants include linear alkyl diphenyl oxide disulfonates, believed to be of the general formula

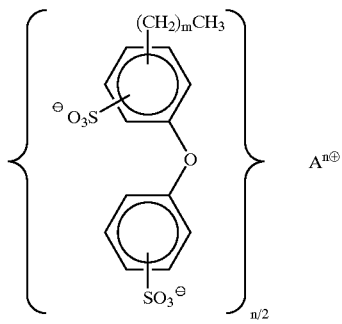

wherein m is an integer, typically of from 1 to about 15 and preferably from 1 to about 10, A is any desired cation, including (but not limited to) alkali metal cations, such as $Li^+$, $Na^+$, and $K^+$, alkaline earth metal cations, such as $Mg^{2+}$ and $Ca^{2+}$, transition metal cations, such as chromium, iron, manganese, cobalt, nickel, vanadium, titanium, ruthenium, platinum, and the like, $Zn^{2+}$, ammonium ($NH_4^+$), other protonated amines, such as protonated ethylene diamine, choline, and the like, as well as mixtures thereof, and n represents the charge on the cation and the relative ratio of cation and anion. (For example, when the cation has a +1 charge, there are two cations per anion; when the cation has a +2 charge, there is one cation per anion; and the like.) Specific examples of suitable surfactants include sodium n-decyl diphenyl oxide disulfonate (CALFAX IOL-45), sodium dodecyl diphenyl oxide disulfonate (CALFAX DB-45), and sodium hexadecyl diphenyl oxide disulfonate (CALFAX 16L-35), commercially available from Pilot Chemical Co., Santa Fe Springs, Calif., and the like, as well as mixtures thereof. The dianionic surfactant is present in the washing composition in any desired or effective amount, typically at least about 1 percent by weight of the washing composition, preferably at least about 3 percent by weight of the washing composition, and more preferably at least about 5 percent by weight of the washing composition, and typically up to about 25 percent by weight of the washing composition, preferably up to about 20 percent by weight of the washing composition, and more preferably up to about 15 percent by weight of the washing composition, although the amount can be outside of these ranges.

The washing composition further contains a salt. The salt has a chloride, bromide, iodide, nitrate, acetylacetonate, polyphosphate, squarate, or sulfonate anion. The suitable sulfonate anions include the $HSO_3^-$ anion as well as anions such as tosylate and mesylate, including those anions of the general formula $R—SO_3^-$, wherein R is an alkyl group, including saturated, unsaturated, branched, linear, cyclic, substituted, and unsubstituted alkyl groups, said alkyl groups having at least one carbon atom, and typically having up to about 30 carbon atoms, preferably up to about 20 carbon atoms, and more preferably up to about 14 carbon atoms, although the number of carbon atoms can be outside of these ranges, aryl groups, included substituted and unsubstituted aryl groups, said aryl groups having at least 6 carbon atoms, and typically having up to about 24 carbon atoms, preferably up to about 18 carbon atoms, and more preferably up to about 12 carbon atoms, although the number of carbon atoms can be outside of these ranges, arylalkyl groups (wherein either the aryl portion or the alkyl portion can be attached to the $—SO_3^-$ group), said arylalkyl groups having at least 7 carbon atoms, and typically having up to about 32 carbon atoms, preferably up to about 26 carbon atoms, and more preferably up to about 20 carbon atoms, although the number of carbon atoms can be outside of these ranges, and heterocyclic groups, including heterocycles of carbon with nitrogen, sulfur, oxygen, phosphorus, silicon, typically having at least about 4 carbon atoms, and typically having up to about 17 carbon atoms, preferably up to about 12 carbon atoms, and more preferably up to about 10 carbon atoms, although the number of carbon atoms can be outside of these ranges, wherein the substituents on the substituted alkyl, aryl, arylalkyl, and heterocyclic groups can be (but are not limited to) hydroxy groups, amine groups, ammonium groups, cyano groups, pyridine groups, pyridinium groups, ether groups, aldehyde groups, ketone groups, ester groups, amide groups, carbonyl groups, sulfide groups, sulfoxide groups, phosphine groups, phosphonium groups, nitrile groups, mercapto groups, nitroso groups, halogen atoms, nitro groups, sulfone groups, acyl groups, mixtures thereof, and the like, wherein two or more substituents can be joined together to form a ring. Any desired cation can be employed, including those listed hereinabove as suitable cations for the salt component in the ink. Particularly preferred cations include $Li^+$, $Na^+$, $K^+$, $NH_4^+$, other quaternary ammonium cations, $Mg^{2+}$, protonated ethylene diamine, $Zn^{2+}$, choline, and the like. Choline is particularly preferred for its hygroscopic properties (which enable the washing solution to refrain from drying out upon exposure to air), its pH insensitivity, and its biological friendliness. The salt is present in the washing composition in any desired or effective amount, typically at least about 3 percent by weight of the washing composition, preferably at least about 5 percent by weight of the washing composition, and more preferably at least about 10 percent by weight of the washing composition, and typically up to about 50 percent by weight of the washing composition, preferably up to about 30 percent by weight of the washing composition, and more preferably up to about 25 percent by weight of the washing composition, although the amount can be outside of these ranges.

The washing composition also contains an organic cosolvent which is propylene glycol, dipropylene glycol, tripropylene glycol, diethylene glycol, glycerine, trimethylolethane ($H_3C$—$C(CH_2OH)_3$ or trimethylolpropane ($H_5C_2$—$C(CH_2OH)_3$, or mixtures thereof. The cosolvent is present in the washing composition in any desired or effective amount, typically at least about 1 percent by weight of the washing composition, preferably at least about 10 percent by weight of the washing composition, and more preferably at least about 20 percent by weight of the washing composition, and typically up to about 60 percent by weight of the washing composition, preferably up to about 50 percent by weight of the washing composition, and more preferably up to about 40 percent by weight of the washing composition, although the amount can be outside of these ranges.

The washing composition optionally additionally contains urea. If present, the urea is present in the washing solution in any desired or effective amount, typically at least about 1 percent by weight of the washing composition, preferably at least about 5 percent by weight of the washing composition, and more preferably at least about 15 percent by weight of the washing composition, and typically up to about 50 percent by weight of the washing composition, preferably up to about 30 percent by weight of the washing composition, and more preferably up to about 25 percent by weight of the washing composition, although the amount can be outside of these ranges.

The washing composition also optionally contains water. If present, the water is present in the washing solution in any desired or effective amount, typically at least about 1 percent by weight of the washing composition, preferably at least about 5 percent by weight of the washing composition, and more preferably at least about 10 percent by weight of the washing composition, and typically up to about 94 percent by weight of the washing composition, preferably up to about 50 percent by weight of the washing composition, and more preferably up to about 30 percent by weight of the washing composition, although the amount can be outside of these ranges.

Preferably, the washing composition is free or substantially free of colorants such as Acid or Basic dyes.

While not being limited to any particular theory, it is hypothesized that the salt increases exchange of the anionic dye molecules ionically associated with the polymer with other anions, such as halides, thereby loosening the dyes from the polymer. The urea is believed to solubilize the free anionic dyes for easy wash-off. The cosolvents are hypothesized to aid in solubilization of the polyquaternary amine/dianionic surfactant/dye moieties to enable superior performance when removing stains from fabrics often difficult to clean, such as cotton terrycloth and tight weave cotton fabric (for example, 200 thread count percale).

Optionally, the washing composition further contains a viscosity building component. Examples of suitable viscosity building components include those disclosed hereinabove as being suitable components for the ink compositions. By adding the viscosity building component to the wash off composition, an easily dispensed gel is obtained which does not run when placed on marked skin or clothing. When present, the viscosity building component is present in the washing composition in any desired or effective amount, typically at least about 0.1 percent by weight of the washing composition, and preferably at least about 1 percent by weight of the washing composition, and typically up to about 5 percent by weight of the washing composition, and preferably up to about 3 percent by weight of the washing composition, although the amount can be outside of these ranges.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by simple mixing of Acid Blue 9 dye (3 parts by weight dye solids), Acid Yellow 23 dye (3 parts by weight dye solids), Acid Red 52 dye (3 parts by weight dye solids), sodium chloride (5 parts by weight), TRITON® X-100 surfactant (1 part by weight), VARIKEM 110 polymer (25 parts by weight of an aqueous solution containing 40 percent by weight polydiallyl dimethyl ammonium chloride polymer, molecular weight about 5,000, and 60 percent by weight water, obtained from Calgon Corp.), and deionized water (60 parts by weight). The ink thus prepared was incorporated into a XEROX® DOCUPRINT® XJ4C thermal ink jet printer and prints were generated on plain paper. The ink exhibited good jetting characteristics, good paper penetrability, and indelible characteristics.

EXAMPLE II

An ink composition was prepared by simple mixing of Acid Blue 9 dye (2.5 parts by weight dye solids), sodium chloride (5 parts by weight), TRITON® X-100 surfactant (1 part by weight), VARIKEM 110 polymer (25 parts by weight of an aqueous solution containing 40 percent by weight polydiallyl dimethyl ammonium chloride polymer, molecular weight about 5,000, and 60 percent by weight water, obtained from Calgon Corp.), and deionized water (66.5 parts by weight). The ink thus prepared was used to fill a felt tipped marking pen, and marks were then made with the pen on plain paper. The images thus generated exhibited good penetration of the paper, sharp lines, no feathering, smear resistance, and waterproof characteristics (as tested by running water from a faucet over the imaged paper).

EXAMPLE III

An ink composition was prepared as described in Example II except that the ink also contained 1 percent by weight of food grade xanthan gum (Keltrol T, obtained from Kelco division of Merck & Co.). The ink was stirred, and, to hasten the homogenization process, the ink was heated to near the boiling temperature of the ink during stirring. The resulting ink had the consistency of a stiff gel upon cooling to ambient temperature.

EXAMPLE IV

Ink compositions prepared as described in Examples I and II were printed onto cotton fabric. To the images thus formed was then applied a washing solution comprising 100 percent by weight of CALFAX 10L-45 dianionic surfactant as received from the manufacturer (obtained from Pilot Chemical Co.; commercial product contained 35 percent by weight surfactant in water), followed by rinsing with water. The ink images thus treated were substantially removed from the fabric, with over 80 percent of the ink marks being washed away.

EXAMPLE V

Ink compositions prepared as described in Examples I and II were printed onto cotton fabric. To the images thus formed was then applied a washing solution comprising 5 percent by weight of CALFAX 10L-45 dianionic surfactant solids (obtained from Pilot Chemical Co.; commercial product contained 35 percent by weight surfactant), 70 percent by weight water (some of which was from the commercial surfactant solution), 10 percent by weight sodium chloride, and 15 percent by weight urea, followed by rinsing with water. The ink images thus treated were substantially removed from the fabric, with over 95 percent of the ink marks being washed away.

EXAMPLE VI

Ink compositions were prepared by simple mixing of various Acid dyes as indicated in the table below, choline chloride (15 parts by weight), TRITON® X-100 surfactant (1 part by weight), CP-1030 polymer (13 parts by weight of an aqueous solution containing 30 percent by weight polydiallyl dimethyl ammonium chloride polymer, molecular weight about 10,000, and 70 percent by weight water, obtained from Calgon Corp.), and deionized water (remainder by weight, wherein percent amounts for each ink add up to 100).

| Ink | Dye Contents (wt. % solids) |
|---|---|
| cyan | 2.5% Acid Blue 9 |
| yellow | 3% Acid Yellow 23 |
| magenta | 2% Acid Red 52 |
| black | 2.4% Acid Red 52 |
|  | 2.8% Acid Yellow 23 |
|  | 1.9% Acid Blue 9 |
| gray | 0.25% Acid Red 52 |
|  | 0.25% Acid Yellow 23 |
|  | 0.2% Acid Blue 9 |
| red | 5% Acid Red 15 |
| blue | 2.5% Acid Blue 9 |
|  | 0.5% Acid Red 52 |
| green | 1.5% Acid Yellow 23 |
|  | 1.5% Acid Blue 9 |
| purple | 2% Acid Red 52 |
|  | 1% Acid Blue 9 |
| brown | 1.5% Acid Red 52 |
|  | 2% Acid Yellow 23 |
| orange | 1.5% Acid Red 15 |
|  | 1% Acid Yellow 23 |
| chartreuse | 0.8% Acid Yellow 23 |
|  | 0.025% Acid Blue 9 |
| pink | 0.1% Acid Red 52 |

The inks thus prepared were incorporated into felts with housings (felt tip marker pens) and applied to 100 percent cotton terrycloth fabric and to 100 percent cotton percale fabric from these pen applicators.

A washing solution was prepared comprising 30 percent by weight of CALFAX 16L-35 dianionic surfactant solution (obtained from Pilot Chemical Co.; commercial product contained 35 percent by weight surfactant and 65 percent by weight water), 20 percent by weight choline chloride, 20 percent by weight urea, and 30 percent by weight dipropylene glycol. The resulting mixture was roll milled for 30 minutes to yield the washing solution.

The washing solution thus prepared was then applied to the generated images and allowed to stand for 15 minutes, followed by rinsing with water by stirring for 15 minutes to simulate washing machine conditions. Each of the ink images thus treated were substantially removed from the fabric, with 100 percent of the ink marks being washed away.

If desired, to the washing solution thus prepared, about 1 percent by weight xanthan gum can be added to the washing solution with stirring, and, to hasten the homogenization process, heating to near the boiling temperature of the washing solution during stirring. The resulting washing solution has the consistency of a stiff gel.

EXAMPLE VII

Images were generated as described in Example VI. A washing solution was prepared as described in Example VI except that the dipropylene glycol was replaced with glycerol. Similar results were obtained.

EXAMPLE VIII

Images were generated as described in Example VI. A washing solution was prepared as described in Example VI except that the dipropylene glycol was replaced with trimethylolpropane. Similar results were obtained.

EXAMPLE IX

Images were generated as described in Example VI. A washing solution was prepared as described in Example VI except that the dipropylene glycol was replaced with trimethylolethane. Similar results were obtained.

EXAMPLE X

Images were generated as described in Example VI. A washing solution was prepared as described in Example VI except that the dipropylene glycol was replaced with diethylene glycol. Similar results were obtained.

EXAMPLE XI

Images were generated as described in Example VI. A washing solution was prepared as described in Example VI except that the dipropylene glycol was replaced with tripropylene glycol. Similar results were obtained.

Example XII (Comparative)

The process of Example VI was repeated except that the washing solution contained no dipropylene glycol (with the dipropylene glycol being replaced by an equal amount of water). The images thus generated required two applications of the washing solution to remove them from the cloth, and required 30 minutes of water rinsing instead of 15 minutes of water rinsing for full removal of the image.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A process which comprises (a) applying to a substrate in an imagewise pattern an ink composition comprising water, an acid or direct dye, a monovalent salt, a polyquaternary amine compound, and an optional nonionic or cationic surfactant, and (b) thereafter washing the substrate with a washing composition which comprises (i) a linear alkyl diphenyl oxide disulfonate compound, (ii) a salt selected from the group consisting of chloride salts, bromide salts, iodide salts, nitrate salts, acetylacetonate salts, polyphosphate salts, squarate salts, sulfonate salts, and mixtures thereof, and (iii) a cosolvent which is propylene glycol, dipropylene glycol, tripropylene glycol, diethylene glycol, glycerine, trimethylolethane, trimethylolpropane, or mixtures thereof.

2. A process according to claim 1 wherein the linear alkyl diphenyl oxide disulfonate compound is selected from n-decyl diphenyl oxide disulfonate salts, dodecyl diphenyl oxide disulfonate salts, hexadecyl diphenyl oxide disulfonate salts, or mixtures thereof.

3. A process according to claim 1 wherein the linear alkyl diphenyl oxide disulfonate compound is selected from sodium n-decyl diphenyl oxide disultonate, sodium dodecyl diphenyl oxide disulfonate, sodium hexadecyl diphenyl oxide disulfonate, or mixtures thereof.

4. A process according to claim 1 wherein the linear alkyl diphenyl oxide disulfonate compound is present in the washing composition in an amount of at least about 1 percent by weight of the washing composition and in an amount of up to about 25 percent by weight of the washing composition.

5. A process according to claim 1 wherein the chloride, bromide, iodide, nitrate, acetylacetonate, polyphosphate, squarate, or sulfonate salt in the washing composition is a salt of $Li^+$, $Na^+$, $K^+$, $Zn^{2+}$, a quaternary ammonium cation, or mixtures thereof.

6. A process according to claim 1 wherein the chloride, bromide, iodide, nitrate, acetylacetonate, polyphosphate, squarate, or sulfonate salt is present in the washing composition in an amount of at least about 3 percent by weight of the washing composition and in an amount of up to about 50 percent by weight of the washing composition.

7. A process according to claim 1 wherein the cosolvent is present in the washing composition in an amount of at least about 1 percent by weight of the washing composition and in an amount of up to about 60 percent by weight of the washing composition.

8. A process according to claim 1 wherein the washing composition further comprises urea.

9. A process according to claim 8 wherein the urea is present in the washing composition in an amount of at least about 1 percent by weight of the washing composition and in an amount of up to about 50 percent by weight of the washing composition.

10. A process according to claim 1 wherein the washing composition further comprises water.

11. A process according to claim 10 wherein the water is present in an amount of at least about 1 percent by weight of the washing composition and in an amount of up to about 94 percent by weight of the washing composition.

12. A process according to claim 1 wherein the washing composition further comprises a viscosity building component.

13. A process according to claim 12 wherein the viscosity building component is present in the washing composition in an amount of at least about 0.1 percent by weight of the washing composition and in an amount of up to about 5 percent by weight of the washing composition.

14. A process according to claim 1 wherein the substrate is cotton.

15. A process according to claim 1 wherein the polyquaternary amine compound is selected from the group consisting of polydiallyl ammonium compounds, polyquaternized polyvinylamines, polyquaternized polyallylamines, and mixtures thereof.

16. A process according to claim 1 wherein the monovalent salt in the ink composition has a cation selected from the group consisting of alkali metal ions, alkaline earth metal ions, transition metal cations, $NH_4^+$, $N(CH_3)_4^+$, choline,

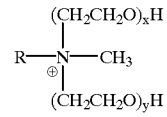

wherein R is a long chain alkyl group with 12 carbon atoms, x and y are integers of 0, 1, or 2 representing the number of ethoxy groups, wherein x+y=2, and mixtures thereof.

17. A process according to claim 1 wherein the monovalent salt in the ink composition contains anions selected from the group consisting of chloride, bromide, iodide, sulfate, acetate, propionate, nitrate, perchlorate, acetylacetonate, squarate, and mixtures thereof.

18. A process according to claim 1 wherein the washing composition comprises (i) a linear alkyl diphenyl oxide disulfonate compound, (ii) a salt selected from the group consisting of chloride salts, bromide salts, iodide salts, nitrate salts, acetylacetonate salts, polyphosphate salts, squarate salts, sulfonate salts, and mixtures thereof, and(iii) a cosolvent which is dipropylene glycol, tripropylene glycol, diethylene glycol, glycerine, trimethylolethane, trimethylolpropane, or mixtures thereof.

19. A process according to claim 1 wherein the chloride, bromide, iodide, nitrate, acetylacetonate, polyphosphate, squarate, or sulfonate salt in the washing composition is a salt of choline.

20. A process according to claim 1 wherein the washing composition consists essentially of (a) a linear alkyl diphenyl oxide disulfonate compound, (b) a chloride, bromide, iodide, nitrate, acetylacetonate, polyphosphate, squarate, or sulfonate salt or mixtures thereof, (c) a cosolvent which is propylene glycol, dipropylene glycol, tripropylene glycol, diethylene glycol, glycerine, trimethylolethane, trimethylolpropane, or mixtures thereof, (d) an optional component consisting essentially of urea, (e) an optional component consisting essentially of water, and (f) an optional viscosity building component.

21. A process according to claim 1 wherein the washing composition consists of (a) a linear alkyl diphenyl oxide disulfonate compound, (b) a chloride, bromide, iodide, nitrate, acetylacetonate, polyphosphate, squarate, or sulfonate salt or mixtures thereof, (c) a cosolvent which is propylene glycol, dipropylene glycol, tripropylene glycol, diethylene glycol, glycerine, trimethylolethane, trimethylolpropane, or mixtures thereof, (d) an optional component consisting of urea, (e) an optional component consisting of water, and (f) an optional viscosity building component.

22. A process according to claim 1 wherein the cosolvent in the washing composition is dipropylene glycol.

23. A process according to claim 1 wherein the cosolvent in the washing composition is trimethylolethane.

24. A process according to claim 1 wherein the washing composition comprises (a) a linear alkyl diphenyl oxide disulfonate compound which is sodium n-decyl diphenyl oxide disulfonate, sodium dodecyl diphenyl oxide disulfonate, or sodium hexadecyl diphenyl oxide disulfonate, (b) choline chloride, (c) urea, (d) water, and (e) dipropylene glycol.

25. A process according to claim 24 wherein the linear alkyl diphenyl oxide disulfonate compound is sodium hexadecyl diphenyl oxide disulfonate.

* * * * *